(12) United States Patent
Yamagata et al.

(10) Patent No.: US 11,480,746 B2
(45) Date of Patent: Oct. 25, 2022

(54) FIBER OPTICAL TRANSCEIVER AND OPTICAL COMMUNICATION MODULE

(71) Applicant: Yazaki Corporation, Tokyo (JP)

(72) Inventors: Chiemi Yamagata, Susono (JP); Motonori Miyanari, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/204,367

(22) Filed: Mar. 17, 2021

(65) Prior Publication Data

US 2021/0302670 A1    Sep. 30, 2021

(30) Foreign Application Priority Data

Mar. 27, 2020    (JP) .............................. JP2020-056959

(51) Int. Cl.
*H04B 10/00*   (2013.01)
*G02B 6/42*    (2006.01)
*H04B 10/40*   (2013.01)

(52) U.S. Cl.
CPC ............ *G02B 6/426* (2013.01); *H04B 10/40* (2013.01)

(58) Field of Classification Search
CPC combination set(s) only.
See application file for complete search history.

(56) References Cited

U.S. PATENT DOCUMENTS

| | | | |
|---|---|---|---|
| 6,854,901 B1* | 2/2005 | Ouchi .................. | G02B 6/1221 385/88 |
| 8,777,496 B2* | 7/2014 | Kuwahara .............. | H05K 1/118 361/679.01 |
| 2003/0086660 A1* | 5/2003 | Brezina ................ | G02B 6/4201 385/88 |
| 2003/0180030 A1* | 9/2003 | Hirose .................. | H05B 3/141 385/147 |
| 2005/0230795 A1* | 10/2005 | Furuyama ............ | G02B 6/4284 257/E21.514 |
| 2018/0009072 A1* | 1/2018 | Kittel ...................... | B23P 15/26 |
| 2021/0302670 A1* | 9/2021 | Yamagata ............. | H04B 10/40 |
| 2022/0014272 A1* | 1/2022 | Shin .................... | H04J 14/0216 |

FOREIGN PATENT DOCUMENTS

| | | |
|---|---|---|
| JP | 2000009970 A | 1/2000 |
| JP | 2003107301 A | 4/2003 |
| JP | 2003224324 A | 8/2003 |
| JP | 2006041234 A | 2/2006 |
| JP | 2011155091 A | 8/2011 |
| JP | 2013-98463 A | 5/2013 |

\* cited by examiner

*Primary Examiner* — Agustin Bello
(74) *Attorney, Agent, or Firm* — Sughrue Mion, PLLC

(57) ABSTRACT

A fiber optical transceiver includes a package, a plurality of lead frames provided with the package and protruding outward from the package, a first circuit board installed in the package and electrically connected to the plurality of lead frames, and an optical element provided on the first circuit board. The package includes a ceramic portion formed of ceramic and covered with a metallized film.

6 Claims, 4 Drawing Sheets

FIBER OPTICAL TRANSCEIVER AND OPTICAL COMMUNICATION MODULE

CROSS REFERENCE TO RELATED APPLICATIONS

This application claims priority from Japanese Patent Application No. 2020-056959 filed on Mar. 27, 2020, the entire contents of which are incorporated herein by reference.

BACKGROUND OF THE INVENTION

Field of the Invention

The present invention relates to a fiber optical transceiver (FOT) and an optical communication module.

Description of Related Art

For example, Patent Literature 1 (JP-A-2013-98463) discloses an optical communication module including a FOT. In the optical communication module in the related art, since a package of the FOT is formed of resin and a noise component passes through the resin, a metal shield case is provided separately from the FOT in order to prevent the noise component from radiating to the outside of the optical communication module.

[Patent Literature 1] JP-A-2013-98463

In an optical communication module in a related art, since a metal shield case is provided separately from a FOT, a number of components is increased and a size of the optical communication module is increased. Further, in an optical connector serving as an optical communication module in a related art, a large opening portion for fitting with a counterpart connector is provided in a shield case, or a gap for fixing the shield case to a substrate of the optical connector is present in the shield case. Therefore, in the FOT in the related art, it is necessary to prevent the noise component from radiating to the outside of the optical communication module.

SUMMARY

One or more embodiments provide a FOT and an optical communication module capable of preventing a noise component from radiating the outside of the optical communication module and reducing the number of components of the optical communication module.

In an aspect (1), a FOT includes a package, a plurality of lead frames provided with the package and protruding outward from the package, a first circuit board installed in the package and electrically connected to the plurality of lead frames, and an optical element provided on the first circuit board. The package includes a ceramic portion formed of ceramic and covered with a metallized film.

In an aspect (2), an optical communication module includes the FOT according to the aspect (1) and a second circuit board electrically connected to the plurality of lead frames.

DETAILED DESCRIPTION

Hereinafter, the present invention will be described in accordance with a preferred embodiment. The present invention is not limited to the following embodiments, and can be modified as appropriate without departing from the scope of the present invention. In the embodiments described below, some configurations are not shown or described, but it goes without saying that a known or well-known technique is applied as appropriate to details of an omitted technique within a range in which no contradiction occurs to contents described below.

Figure 1:
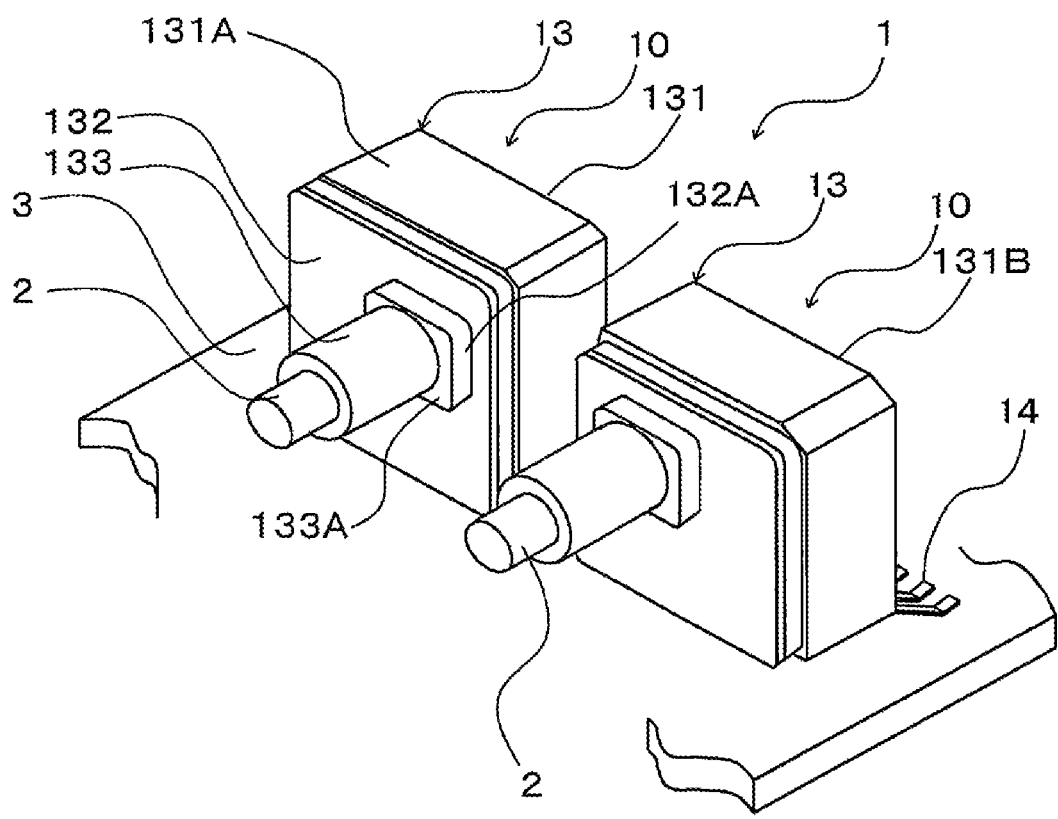
FIG. 1 is a perspective view showing an optical communication module according to an embodiment.
Figure 2:
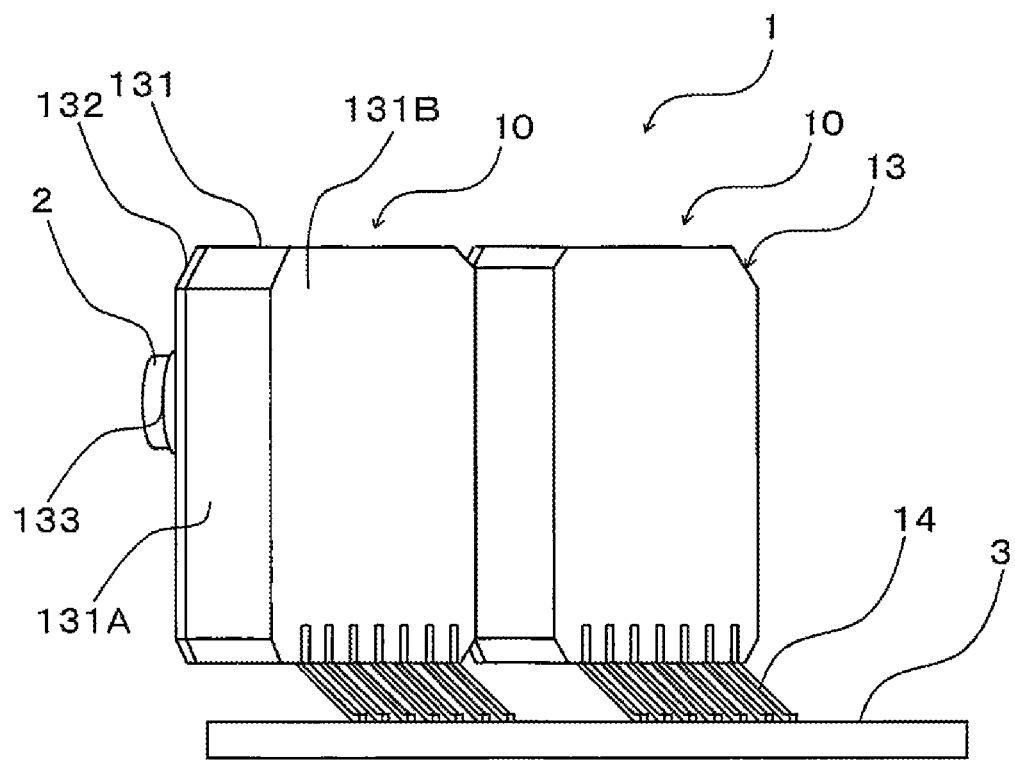
FIG. 2 is a perspective view showing the optical communication module shown in FIG. 1 as viewed from a rear surface side.
Figure 3:
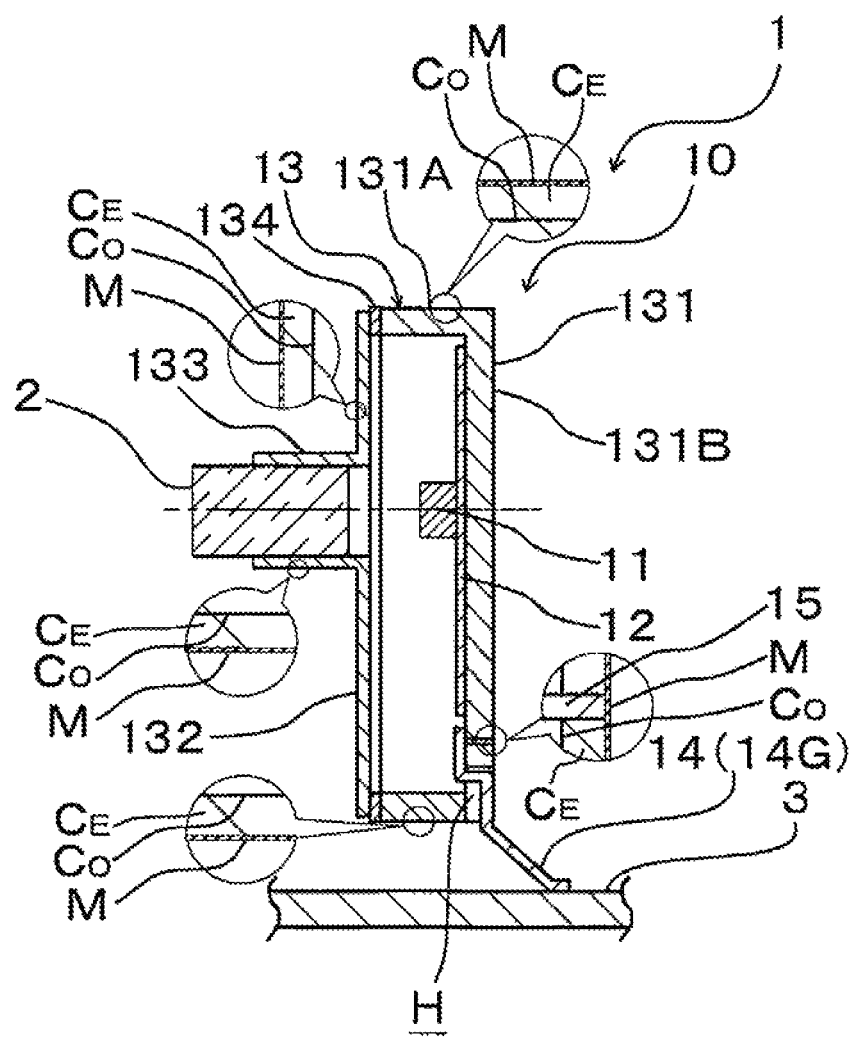
FIG. 3 is a side cross sectional view showing the optical communication module shown in FIG. 1.

FIG. 1 is a perspective view showing an optical communication module 1 according to an embodiment of the present invention. FIG. 2 is a perspective view showing the optical communication module 1 shown in FIG. 1 as viewed from a rear surface side. FIG. 3 is a side cross sectional view showing the optical communication module 1 shown in FIG. 1.

The optical communication module 1 shown in these drawings includes a pair of FOTs 10, a pair of light guide members 2, and a circuit board 3. The pair of FOTs 10 is mounted on the circuit board 3. Each of the FOTs 10 includes a photoelectric conversion element 11 (see FIG. 3). The photoelectric conversion element 11 provided in one of the pair of FOTs 10 is a light emitting element. The photoelectric conversion element 11 provided in the other FOT 10 is a light receiving element.

One of the light guide members 2 is provided corresponding to one FOT 10, and guides light from the photoelectric conversion element 11 of the FOT 10 toward a front side. The other light guide member 2 is provided corresponding to the other FOT 10, and guides light toward the photoelectric conversion element 11 of the other FOT 10.

The FOT 10 includes the photoelectric conversion element 11, a circuit board 12 (see FIG. 3), a package 13, a plurality of lead frames 14, and a GND pin (ground pin) 15 (see FIG. 3). The photoelectric conversion element 11 is mounted on the circuit board 12.

The package 13 is a casing having a square box shape, and accommodates the photoelectric conversion element 11 and the circuit board 12. The package 13 includes a body portion 131, a front surface portion 132, and a light guide portion 133.

The body portion 131 includes a square frame portion 131A and a rear surface portion 131B. The frame portion 131A and the rear surface portion 131B are integrally formed. The frame portion 131A and the rear surface portion 131B may be separately manufactured, and may be joined by welding, bonding, or the like. The circuit board 12 is attached to a front surface (inner surface) of the rear surface portion 131B.

A material of the body portion 131 is multilayer ceramic. The multilayer ceramic are a material formed by stacking a layer $C_E$ (see FIG. 3) formed of two or more layers of ceramic (hereinafter, referred to as a ceramic layer) and a layer $C_O$ (see FIG. 3) formed of one or more conductive materials (hereinafter referred to as a conductive layer). A surface layer (outermost layer) of the multilayer ceramic is the ceramic layer $C_E$ in the present embodiment.

The front surface portion 132 is a plate member constituting a front surface of the package 13. Examples of a material of the front surface portion 132 include ceramic and metal. The material of the front surface portion 132 is multilayer ceramic similarly to the body portion 131 in the present embodiment. A square opening portion is formed in the vicinity of a center portion of the front surface portion 132, and a pedestal portion 132A (see FIG. 1) having a square frame shape protrudes from a peripheral edge portion of the opening portion.

According to one or more embodiments, the FOT and the optical communication module can prevent the noise component from radiating to the outside of the optical communication module and can reduce the number of components of the optical communication module.

An opening edge portion of the frame portion 131A and an outer edge portion of a rear surface of the front surface portion 132 are bonded to each other by an adhesive 134 (see FIG. 3). The adhesive 134 is preferably an adhesive having an excellent electromagnetic wave shielding property.

The light guide portion 133 is a cylindrical member, and the light guide member 2 is inserted into the light guide portion 133. Examples of a material of the light guide portion 133 include ceramic and metal. The material of the light guide portion 133 is multilayer ceramic similarly to the front surface portion 132 in the present embodiment. A square plate-shaped flange portion 133A (see FIG. 1) is formed at a base end portion of the light guide portion 133. An outer edge portion of the flange portion 133A and an opening edge portion of the pedestal portion 132A are joined by welding, bonding, or the like.

The light guide portion 133 is disposed in a manner in which the center of a light emitting surface or a light receiving surface of the photoelectric conversion element 11 is positioned on an extension line of a central axis of the light guide portion 133. Light emitted from the light emitting surface of the photoelectric conversion element 11 serving as a light emitting element passes through the light guide member 2. On the other hand, the light passed through the light guide member 2 is incident on the light receiving surface of the photoelectric conversion element 11 serving as a light receiving element.

The plurality of lead frames 14 are arranged at predetermined intervals along a lower side of the rear surface portion 131B. A lower end portion of each of the plurality of lead frames 14 is electrically connected to an electrode of the circuit board 3. An upper end portion of each of the lead frames 14 is attached to a lower end portion of the rear surface portion 131B. At the lower end portion of the rear surface portion 131B, a plurality of openings H (see FIG. 3) are formed at predetermined intervals along the lower side of the rear surface portion 131B. An upper portion of each of the plurality of lead frames 14 is inserted into the package 13 through each of the openings H, and is fixed to a lower end of a front surface of the rear surface portion 131B. The plurality of lead frames 14 are electrically connected to electrodes or electronic components of the circuit board 12 via conductive members (not shown) such as wire bonding.

The plurality of lead frames 14 include at least one GND lead frame (ground lead frame) 14G (see FIG. 3). The GND lead frame 14G is electrically connected to a GND electrode (not shown) of the circuit board 3.

Here, the optical communication module 1 according to the present embodiment does not include a metal shield case separate from the FOT 10. In the optical communication module 1 according to the present embodiment, the FOT 10 has a configuration for preventing a noise component from radiating to the outside of the FOT 10. Hereinafter, the configuration of the FOT 10 for preventing the noise component from radiating to the outside of the FOT 10 will be described with reference to FIG. 3.

The package 13 formed of ceramic (multilayer ceramic in the present embodiment) in the FOT 10 includes a metallized film M. The metallized film M is formed by forming a metal film on a surface of the ceramic layer $C_E$ of a surface layer of the package 13. Examples of a material of the metallized film M include nickel (Ni) and silver (Ag).

The metallized film M is formed on the entire frame portion 131A including an upper surface, a lower surface, a left surface, and a right surface. The metallized film M is formed on the entire rear surface (outer surface) of the rear surface portion 131B. The metallized film M is formed on the entire front surface of the front surface portion 132 and the entire pedestal portion 132A including an upper surface, a lower surface, a left surface, and a right surface. Further, the metallized film M is formed on the entire surface of the light guide portion 133. Although not shown, the metallized film M is formed on the left and right surfaces of the frame portion 131A in the same manner as the upper and lower surfaces of the frame portion 131A.

The GND pin 15 is provided at a lower portion of the rear surface portion 131B, and passes through the lower portion of the rear surface portion 131B in a thickness direction of the rear surface portion 131B. The GND pin 15 is provided at a position overlapping an upper portion of the GND lead frame 14G. One end of the GND pin 15 is in contact with the upper portion of the GND lead frame 14G, and the other end of the GND pin 15 is in contact with the metallized film M. That is, the GND pin 15 electrically connects the metallized film M and the GND lead frame 14G. Since the GND lead frame 14G is electrically connected to the GND electrode of the circuit board 3, the metallized film M is electrically connected to the GND electrode of the circuit board 3 via the GND pin 15 and the GND lead frame 14G.

On the other hand, the plurality of lead frames 14 other than the GND lead frame 14G are not in contact with the metallized film M and the conductive layer $C_O$. Therefore, the plurality of lead frames 14 are electrically insulated from one another.

An example of a method for manufacturing the package 13 according to the present embodiment will be described. First, the body portion 131 is molded using the above-described multilayer ceramic as a material, and the GND pin 15 is integrally formed with the body portion 131 at the time of molding or after molding. Next, a metallizing processing is performed on surfaces of the body portion 131 that is integrally formed with the GND pin 15. In the metallizing processing, the body portion 131 is energized to form a metal film on a surface of the ceramic layer $C_E$. In the metallizing processing, the metallized film M and the GND pin 15 are brought into contact with each other.

Next, the plurality of lead frames 14 and the circuit board 12 are attached to the body portion 13 after the metallizing processing is performed. At this time, the GND lead frame 14G and the GND pin 15 are brought into contact with each other. Thereafter, the circuit board 12 is attached to the body portion 131, and the circuit board 12 and the plurality of lead frames 14 are electrically connected to each other. On the other hand, the front surface portion 132 and the light guide portion 133 are integrally molded using the multilayer ceramic as a material, and a metallizing processing is performed on surfaces of the front surface portion 132 and the light guide portion 133. Finally, the front surface portion 132 and the body portion 131 are bonded by the adhesive 134.

As described above, in the optical communication module 1 according to the present embodiment, the package 13 of the FOT 10 is formed of ceramic and is covered with the metallized film M. The metallized film M absorbs a noise component generated inside the FOT 10. Accordingly, it is possible to prevent the noise component generated inside the FOT 10 from radiating to the outside of the optical communication module 1 without providing a metal shield case separate from the FOT 10. Therefore, it is possible to prevent the noise component from radiating to the outside of the optical communication module 1, reduce the number of components of the optical communication module 1, and reduce the size of the optical communication module 1.

In the optical communication module 1 according to the present embodiment, the front surface, the rear surface, the upper and lower surfaces, and the left and right surfaces of the ceramic package 13 of the FOT 10 are covered with the metallized film M. Accordingly, a gap of an electromagnetic wave shield can be reduced and the noise component can be prevented from radiating to the outside of the optical communication module 1, as compared with the related art in which a package includes a resin FOT and a separate shield case.

In the optical communication module 1 according to the present embodiment, the metallized film M is electrically connected to the GND electrode of the circuit board 3 via the GND pin 15 and the GND lead frame 14G. Therefore, the noise component generated inside the FOT 10 is absorbed by the metallized film M, and flows to the GND electrode of the circuit board 3 through the GND pin 15 and the GND lead frame 14G. Therefore, noise resistance can be improved.

In the optical communication module 1 according to the present embodiment, the package 13 is formed of multilayer ceramic in which the ceramic layer $C_E$ and the conductive layer $C_O$ are stacked, so that the package 13 can be energized during a metallizing processing. Therefore, the metallizing processing can be performed on surfaces of the package 13, and the metallized film M can be formed on the surfaces of the package 13.

Figure 4:
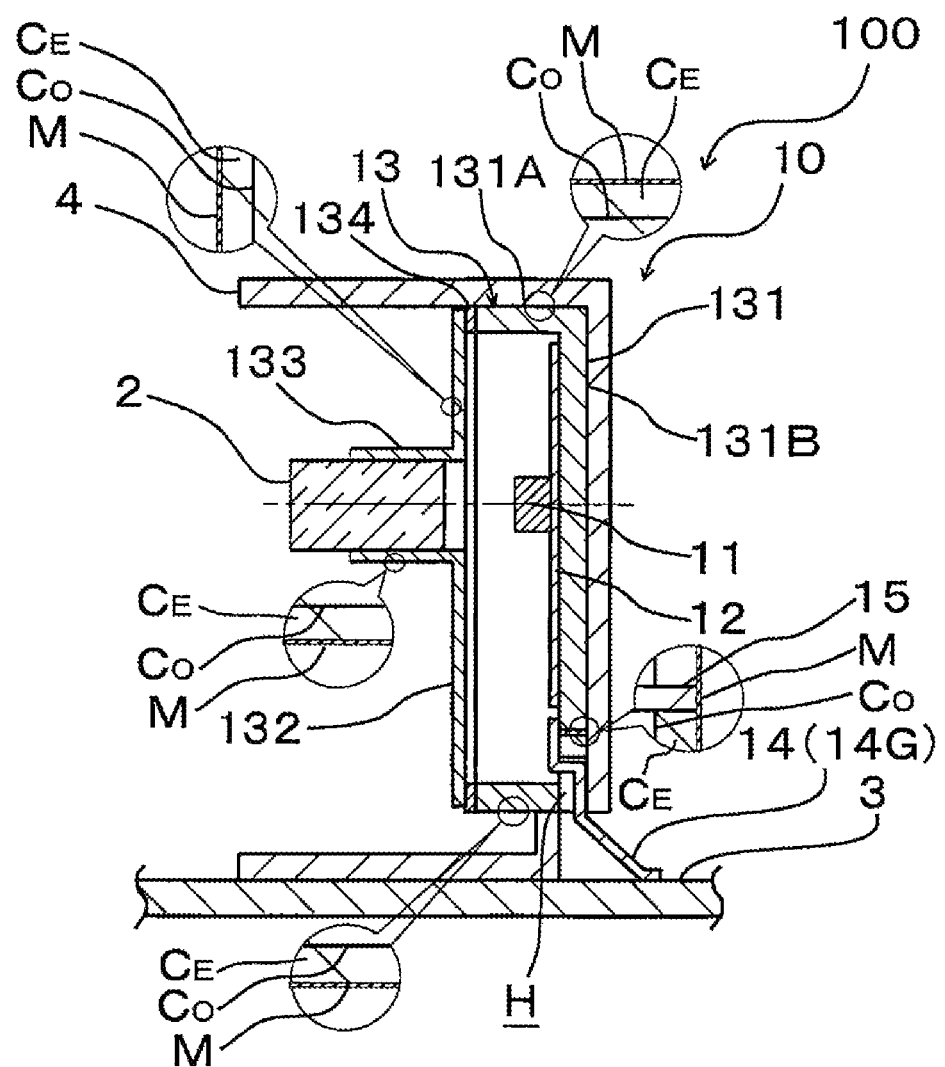
FIG. 4 is a side cross sectional view showing an optical communication module according to another embodiment.

FIG. 4 is a side cross sectional view showing an optical communication module 100 according to another embodiment of the present invention. Configurations the same as those in the embodiment described above are denoted by the same reference numerals, and the description of the embodiment described above is incorporated herein by reference.

The optical communication module 100 according to the present embodiment includes a pair of FOTs 10, a pair of light guide members 2, the circuit board 3, and a shield case 4. The optical communication module 100 is an optical connector, and is provided with a large opening portion for fitting with a counterpart connector. A front surface of each the pair of FOTs 10 is opened to a front side (left side in the drawing) due to the opening portion. On the other hand, the shield case 4 covers upper, lower, left, right, and rear surfaces of the pair of FOTs 10.

In the optical communication module 100 according to the present embodiment, the metallized film M formed on the surfaces of the package 13 and the metal shield case 4 function as a double electromagnetic wave shield against the noise component generated inside the FOT 10. Therefore, it is possible to prevent the noise component from radiating to the outside of the optical communication module 100 without increasing the number of components, as compared with the related art in which a package includes a resin FOT and a separate shield case.

Although the present invention has been described based on the embodiment, the present invention is not limited to the embodiment described above. The present invention may be modified as appropriate without departing from the gist of the present invention, or known and well-known techniques may be combined as appropriate.

For example, the entire package 13 is formed of ceramic and the entire package 13 is covered with the metallized film M in the embodiment described above. However, for example, the body portion 131 may be formed of ceramic, the entire body portion 131 may be covered with the metallized film M, and the front surface portion 132 and the light guide portion 133 may be formed of metal so that the front surface portion 132 and the light guide portion 133 are not covered with the metallized film M. That is, it is not essential that the entire package 13 is formed of ceramic, and it is not essential to cover the entire package 13 with the metallized film M. The package 13 may be implemented by integrating a ceramic portion covered with the metallized film M and a portion of a material having an excellent electromagnetic wave shielding property.

Although the ceramic material of the package 13 is multilayer ceramic in the above embodiment, the ceramic material of the package 13 may be any ceramic as long as the package 13 can be energized during the metallizing processing and can prevent a short circuit of the lead frame 14.

The GND lead frame 14G included in the plurality of lead frames 14 is electrically connected to the metallized film M via the GND pin 15 serving as a conductive member provided in the package 13 in the embodiment described above. However, the GND lead frame 14G may be electrically connected to the metallized film M by being brought into direct contact with the metallized film M.

Although the FOT 10 including the photoelectric conversion element 11 for light emission and the FOT 10 including the photoelectric conversion element 11 for light reception are provided in the embodiment described above, the FOT 10 including both the photoelectric conversion element 11 for light emission and the photoelectric conversion element 11 for light reception may be provided.

According to one or more embodiments, the FOT and the optical communication module can prevent the noise component from radiating to the outside of the optical communication module and can reduce the number of components of the optical communication module.

What is claimed is:
1. A fiber optical transceiver comprising:
a package;
a plurality of lead frames provided with the package and protruding outward from the package;
a first circuit board installed in the package and electrically connected to the plurality of lead frames; and
an optical element provided on the first circuit board,
wherein the package includes a ceramic portion formed of ceramic and covered with a metallized film, and
wherein a cavity is formed by a plurality of surfaces of the ceramic portion of package and the first circuit board, the optical element, and portions of the lead frames are within the cavity.
2. The fiber optical transceiver according to claim 1, wherein the plurality of lead frames include a ground lead frame electrically connected to the metallized film.

3. The fiber optical transceiver according to claim 1, wherein the ceramic portion is formed of multilayer ceramic in which a conductive layer formed of a conductive material and a ceramic layer formed of ceramic are stacked.

4. An optical communication module comprising:
the fiber optical transceiver according to claim 1; and
a second circuit board electrically connected to the plurality of lead frames.

5. The optical communication module according to claim 4, further comprising:
a metal shield case that is fixed to the second circuit board and surrounds the package.

6. The fiber optical transceiver according to claim 1, wherein the metallized film faces away from the cavity.

* * * * *